P. A. RICCIO.
FOOT OPERATED VALVE.
APPLICATION FILED AUG. 30, 1919.

1,329,209.

Patented Jan. 27, 1920.

WITNESSES

INVENTOR
Pasquale A. Riccio
BY
ATTORNEYS

UNITED STATES PATENT OFFICE.

PASQUALE A. RICCIO, OF BROOKLYN, NEW YORK.

FOOT-OPERATED VALVE.

1,329,209.   Specification of Letters Patent.   Patented Jan. 27, 1920.

Application filed August 30, 1919. Serial No. 320,836.

*To all whom it may concern:*

Be it known that I, PASQUALE A. RICCIO, a citizen of the United States, and a resident of the city of New York, borough of Brooklyn, in the county of Kings and State of New York, have invented a new and Improved Foot-Operated Valve, of which the following is a full, clear, and exact description.

This invention relates to improvements in foot operated valves, and more particularly to valves for radiators such as commonly employed in buildings for heating purposes and is adapted for use in connection with either steam or hot water and which is operated entirely by the foot, thus overcoming the necessity of stooping over and slowly turning a hand valve and sometimes burning the fingers, as is common with devices in general use.

A further object is to provide a valve of the character stated, which is securely locked in closed position after being moved to such position by the foot, and which is released from locking position by means of a foot operated pin so as to permit the valve to spring to full open position.

A further object is to provide a valve of the character stated which can be manufactured and sold at a reasonably low price and which can be attached to any ordinary radiator in general use.

With these and other objects in view the invention consists in certain novel features of construction, and combinations and arrangements of parts, as will be more fully hereinafter described and pointed out in the claims.

In the accompanying drawings—

Figure 1:
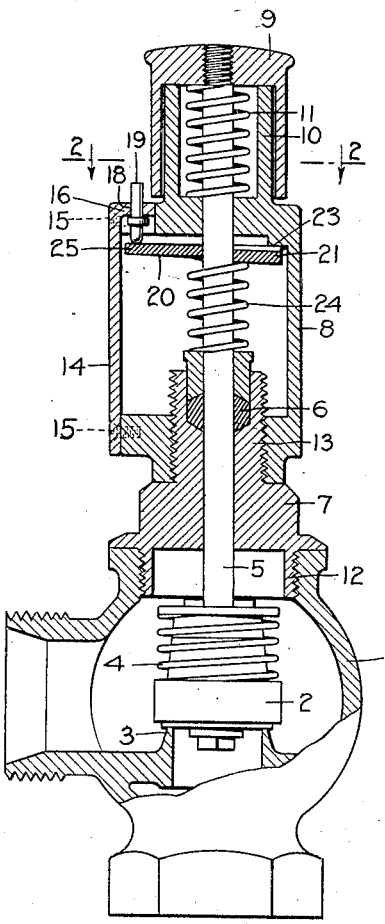
Figure 1 is a view in longitudinal section illustrating my improvements.
Figure 2:
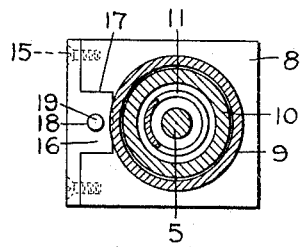
Fig. 2 is a view in transverse section on the line 2—2 of Fig. 1.
Figure 3:
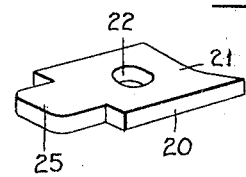
Fig. 3 is a perspective view of the locking plate 20.

1 represents a valve casing which may be connected to any ordinary radiator and form a steam passage as is common in the art. A valve 2 is located in the casing 1 and is adapted to engage a seat 3. This valve 2 may have a slight movement on its operating stem 5 and may have a spring 4 thereon to elastically hold the valve and cause it to snugly engage the seat when closed.

The stem 5 projects upwardly from casing 1 through a coupling 7 and a packing gland 6 in said coupling, thence through a lock casing 8, and has a cap 9 secured on its upper end and telescoping upon a tubular extension 10 on the upper end of the lock casing 8. A coiled spring 11 is housed in the extension 10 and exerts upward pressure on the cap 9 tending to open the valve.

The coupling 7, above referred to, has its larger end 12 screwed into the upper end of casing 1 and its smaller end 13 screwed into the lower end of the lock casing 8.

The lock casing 8 may be of rectangular form, as indicated, and provided with a removable plate 14 secured thereto by screws 15 and having a lug 16 at its upper end fitting in a recess 17 in the top of casing 8. This lug 16 has an opening 18 in which a pin 19 is movable. The pin 19 projects above the top of casing 8 and at its lower end engages a tongue 25 on a locking plate 20.

The locking plate 20 is preferably of dished formation, as shown at 21, and has an opening 22 receiving the stem 5. The inner end of the plate 21 normally bears against a shoulder 23 in casing 8, and a spring 24 around the stem exerts upward pressure against the plate 21 and downward pressure against the packing gland 6.

The pressure of the spring 24 against plate 20 causes the plate to be positioned at an angle to the stem and the walls of the opening 22 bind or grip the stem to prevent longitudinal movement of the latter.

The operation is as follows: Fig. 1 shows the valve in closed position. To open the valve the operator presses downwardly with his foot the pin 19 which causes the locking plate 20 to assume a position at right angles to the stem 5 and release the stem, the spring 11 instantly forcing the valve to open position.

To close the valve, the operator presses downwardly with his foot on the cap 9 forcing the valve to its closed position and the plate 20 will be compelled to assume an angular position relative to the stem by reason of the spring 24 and prevent any upward movement of the stem until the plate is again operated by means of the pin 19.

The device is therefore quick operating, is controlled by the foot of the operator and permits the valve to move either to a full opening or a complete closed position and securely locks the valve in closed position.

Various slight changes may be made in the general form and arrangement of parts described without departing from the invention, and hence I do not limit myself to the precise details set forth but consider myself at liberty to make such changes and alterations as fairly fall within the spirit and scope of the appended claims.

I claim:

1. A device of the character described, comprising a lock casing, means for connecting the lock casing to a valve casing, a stem extending through the lock casing, a valve on the stem, a locking plate in the lock casing having an opening receiving the stem, a spring exerting pressure on the plate causing it to frictionally engage the stem, and means outside of the casing for moving the plate to a position to release the stem.

2. A device of the character described, comprising a lock casing, means for connecting the lock casing to a valve casing, a stem extending through the lock casing, a valve on the stem, a locking plate in the lock casing having an opening receiving the stem, a spring exerting pressure on the plate causing it to frictionally engage the stem, and a pin movable in the lock casing and engaging the plate, said pin adapted to be moved in a direction to force the plate out of its holding position.

3. A device of the character described, comprising a lock casing, a stem projecting through the casing, a valve on the stem, a cap on one end of the stem, a spring located between the lock casing and the cap tending to move the valve in one direction, a locking plate in the casing having an opening receiving the stem, a shoulder in the casing against which one end of the plate engages, a spring in the casing exerting pressure on the plate holding the same normally at an angle to the stem, and frictionally binding the stem, and means for moving the plate to a position to release the stem.

4. A device of the character stated, comprising a lock casing, a stem projecting through the casing, a valve on one end of the stem, a cup on the other end of the stem, a tubular extension on the casing located inside the cup, a spring around the stem in the extension and exerting pressure on the cup, a locking plate in the casing having an opening receiving the stem, a spring engaging the plate and holding the same normally in frictional engagement with the stem, and a pin in the lock casing adapted when moved in one direction to force the plate out of its holding engagement with the stem.

5. A device of the character stated, comprising a lock casing, a stem projecting through the casing, a valve on one end of the stem, a spring pressed cup on the other end of the stem adapted to be foot operated to close the valve, a locking plate in the casing frictionally engaging the stem to hold the valve in closed position, a removable plate on the casing, a lug on the removable plate, and a pin supported in the lug and resting upon the locking plate, said pin adapted to be foot operated to release the locking plate from its holding position.

PASQUALE A. RICCIO.